(12) United States Patent
Leuschke et al.

(10) Patent No.: US 7,549,356 B2
(45) Date of Patent: Jun. 23, 2009

(54) HAND LEVER FIXTURE FOR HANDLEBAR-CONTROLLED VEHICLES, IN PARTICULAR MOTORCYCLES

(75) Inventors: Rainer Leuschke, Rentweinsdorf (DE); Holger Böhme, Rentweinsdorf (DE); Silvio Meusel, Sonneberg (DE)

(73) Assignee: FTE automotive GmbH, Ebern (DE)

( * ) Notice: Subject to any disclaimer, the term of this patent is extended or adjusted under 35 U.S.C. 154(b) by 664 days.

(21) Appl. No.: 11/217,197

(22) Filed: Sep. 1, 2005

(65) Prior Publication Data

US 2006/0185465 A1  Aug. 24, 2006

(30) Foreign Application Priority Data

Feb. 23, 2005  (DE)  ................... 20 2005 003 033 U (51) Int. Cl.
*F16C 1/12* (2006.01)
(52) U.S. Cl. ..................................................... 74/501.6
(58) Field of Classification Search ................ 74/500.5, 74/501.5 R, 501.6, 551.1, 551.2, 551.3, 551.4, 74/551.5, 551.6, 551.7, 551.8, 551.9, 502.2; 254/243; 60/594
See application file for complete search history.

(56) References Cited

U.S. PATENT DOCUMENTS

| 4,635,442 | A | * | 1/1987 | Bass | ............................ | 60/594 |
| 4,823,553 | A | * | 4/1989 | Reynolds | ..................... | 60/585 |
| 4,840,082 | A | | 6/1989 | Terashima et al. | | |
| 7,222,703 | B2 | * | 5/2007 | Laghi et al. | .................. | 188/344 |
| D556,114 | S | * | 11/2007 | Hardesty Thompson | ... | D12/218 |

FOREIGN PATENT DOCUMENTS

| DE | G 89 13 278.5 | 4/1990 |
| DE | 100 17 198 A1 | 10/2001 |
| EP | 0 405 945 B1 | 4/1994 |
| EP | 0 640 051 B1 | 3/1995 |
| JP | 08-258777 A | 10/1996 |

* cited by examiner

*Primary Examiner*—Vicky A Johnson
(74) *Attorney, Agent, or Firm*—Reising Ethington P.C.

(57) ABSTRACT

A hand lever fixture has a support body which can be attached to a handlebar, on which support body a hand lever and an over-center spring are pivotably mounted, said hand lever being effectively connected to a master cylinder and said over-center spring being effectively connected to the hand lever, which over-center spring, when the hand lever is in a position between a dead center position and an end position, generates a lever moment on the hand lever, said lever moment acting in the direction of the end position. The hand lever is split into a main lever which can be acted upon manually and an auxiliary lever pivotably mounted on the support body, at the end of which auxiliary lever the over-center spring is articulated while an auxiliary force resulting from the over-center spring lever moment can be transmitted to the master cylinder via its other end. The main lever is pivotably mounted on the auxiliary lever and an adjustment device is arranged between the main lever and the auxiliary lever, by means of which the relative angular position of main lever and auxiliary lever can be adjusted. As a result, a compact hand lever fixture is provided in which the grip width between hand lever and handlebar can be adjusted without this having an effect on the force assistance brought about by the over-center spring.

15 Claims, 6 Drawing Sheets

FIG. 15

HAND LEVER FIXTURE FOR HANDLEBAR-CONTROLLED VEHICLES, IN PARTICULAR MOTORCYCLES

TECHNICAL FIELD

The invention relates to a hand lever fixture for handlebar-controlled vehicles, such as motorized and non-motorized two-wheeled vehicles, but also so-called "trikes" and "quads" or the like. In particular, the invention relates to a hand lever fixture for motorcycles, wherein such hand lever fixtures are used to actuate both hydraulic brake systems and hydraulic clutch actuation systems.

PRIOR ART

Even in motorcycles there is a trend towards more powerful motorization. This means, among other things, that the dry friction clutches used in motorcycles have to be made larger in order to transmit correspondingly higher torques, and this is associated with an increase in the actuating forces required to disengage the clutch. When using a hydraulic clutch actuation system, the driver need not apply these actuating forces to their full extent to the hand lever of the hand lever fixture but rather can apply them only to a reduced extent on account of the hydraulic transmission of the clutch actuation system, which leads to mechanical transmission by the hand lever. However, certain design limits also exist when designing and selecting these hydraulic and mechanical transmissions, so that in many cases additional force assistance has become desirable for the disengagement operation.

In this connection, JP 08-258777, which forms the generic design, has already disclosed a hand lever fixture for motorcycles which has a support body which can be attached to a handlebar, on which support body a hand lever is pivotably mounted, said hand lever being effectively connected to a master cylinder in order to generate an actuating pressure. Moreover, in this prior art, an over-center spring is pivotably mounted on the support body, which over-center spring is effectively connected to the hand lever in such a way that, when the hand lever is in a position between a dead center position and an end position, the over-center spring generates a lever moment on the hand lever, said lever moment acting in the direction of this end position. Accordingly, the actuating force applied manually to the hand lever by the vehicle driver for an actuating operation is force-assisted by the spring force of the over-center spring from a certain actuating travel of the hand lever.

Besides the requirement that the actuating forces to be applied to the hand lever by the vehicle driver must move in predefined and demonstrable limits, with regard to the operating comfort for hand lever fixtures there is also the further requirement that the grip geometry, in particular the grip width, that is to say the clear distance between handlebar and hand lever in the non-actuated state of the latter, must be able to be adapted within predefined limits to the vehicle driver, namely to the hand size thereof.

In the prior art, there is no lack of proposals as to how this can be done. For example, constructions are known in which the hand lever is pivotably mounted at one end at a bearing point with respect to the handlebar, whereas a connecting member which connects to the piston of the master cylinder acts on the hand lever at a point of action remote from the bearing point, wherein the bearing point (e.g. DE 100 17 198 A1) or the point of action (e.g. DE 89 13 278 U1) can be adjusted in a direction perpendicular to the handlebar in order to adjust the grip width. Constructions are also known in which the hand lever is pivotably mounted between its ends at a bearing point with respect to the handlebar, whereas the connecting member which connects to the piston of the master cylinder acts on the hand lever at a point of action provided at one end of the hand lever, wherein the point of action can be adjusted in a direction perpendicular to the handlebar (e.g. EP 0 640 051 B1) or—in the case of an angular hand lever—parallel to the handlebar (e.g. EP 0 405 945 B1), in order to adjust the grip width. However, these solutions are suitable only to a limited extent, if at all, for use on a generic hand lever fixture since the grip width adjustment would interfere with the geometry of the link chain consisting of support body, hand lever and over-center spring, whereupon different degrees of force assistance by the over-center spring would result for different grip widths, in an undesirable manner.

Based on the prior art according to JP 08-258777, the object of the invention is accordingly to provide a hand lever fixture for handlebar-controlled vehicles, in particular motorcycles, which is of as compact a design as possible and in which the grip width can be adjusted without this having an effect on the force assistance provided by the over-center spring.

SUMMARY OF THE INVENTION

According to the invention, in a hand lever fixture for handlebar-controlled vehicles, in particular motorcycles, which comprises a support body which can be attached to a handlebar, on which support body a hand lever and an over-center spring are pivotably mounted, said hand lever being effectively connected to a master cylinder in order to generate an actuating pressure, wherein the over-center spring is effectively connected to the hand lever in such a way that, when the hand lever is in a position between a dead center position and an end position, the over-center spring generates a lever moment on the hand lever, said lever moment acting in the direction of this end position, the hand lever is split into two, comprising a main lever which can be acted upon manually with an actuating force and an auxiliary lever which is pivotably mounted between its ends at a first bearing point on the support body, at the first end of which auxiliary lever the over-center spring is articulated while an auxiliary force resulting from the lever moment generated by the over-center spring can be transmitted to the master cylinder via its second end, wherein the main lever is pivotably mounted on the auxiliary lever at a second bearing point and an adjustment device is arranged between the main lever and the auxiliary lever, by means of which adjustment device the relative angular position of main lever and auxiliary lever with respect to the second bearing point can be adjusted.

By virtue of the fact that the hand lever is split into two, wherein the auxiliary force of the over-center spring is transmitted solely via the auxiliary lever to the master cylinder while the main lever which can be acted upon by the driver with a manual actuating force is articulated on the auxiliary lever and can be adjusted in terms of its angular position with respect to the auxiliary lever about the articulation point by the adjustment device, a functional separation of auxiliary force assistance on the one hand and grip width adjustment on the other hand is brought about in a simple manner. In other words, the grip width of the hand lever fixture can be adjusted by means of the adjustment device by changing the relative angular position of main lever and auxiliary lever with respect to their connecting point, without this having an effect on the geometry of the link chain consisting of support body, auxiliary lever and over-center spring, so that the auxiliary force assistance brought about by the over-center spring is always independent of the set grip width. The fact that the auxiliary lever is in this case pivotably mounted between its ends at the first bearing point on the support body, that is to say is designed as a two-arm lever, in particular also makes for a compact design of the hand lever fixture.

In principle, it is conceivable to configure the first bearing point and the second bearing point in such a way that they lie on one axis or that the second bearing point is located between the first bearing point and the second end of the auxiliary lever. However, an embodiment is preferred in which the second bearing point is located at the second end of the auxiliary lever, as a result of which direct introduction of the force resulting from the manually applied actuating force into the master cylinder is ensured in an advantageous manner.

With regard to fine adjustability of the actuating pressure, it is furthermore preferred if the second bearing point has a bearing pin which passes through associated bearing holes in the main lever and in the auxiliary lever, wherein a rolling body is rotatably mounted on the bearing pin, which rolling body bears with its outer circumferential surface against a piston of the master cylinder in a manner effective for actuation. As a result, the hand lever acts on the piston of the master cylinder with very little friction.

Furthermore, the arrangement may be such that the adjustment device acts on the auxiliary lever at a distance from the second bearing point. This advantageously results in a transmission ratio, as a result of which the adjustment device—compared to acting in the region of the second bearing point, which would in principle also be possible—is acted upon with comparatively less force so that the adjustment device can be formed in a simpler manner and does not need to be so large.

Continuing the concept of the invention, the adjustment device acts on the auxiliary lever between the first end of the auxiliary lever and the first bearing point, and this once again makes for a compact design.

In one conceivably simple and robust embodiment, the adjustment device comprises an adjustment screw having a head and a threaded shaft and also an internally threaded portion associated with the threaded shaft, wherein the internally threaded portion is attached to the auxiliary lever or to the main lever, whereas the respective other lever has an opening which is passed through by the threaded shaft of the adjustment screw, with the head of the adjustment screw engaging behind this lever at the end of the opening remote from the internally threaded portion. In this case, the head of the adjustment screw forms a stop against pivoting of the main lever with respect to the auxiliary lever, and this can be adjusted by screwing the adjustment screw into and out of the internally threaded portion, wherein, as a result of the pivotable mounting of the main lever on the auxiliary lever, the relative angular position thereof and thus also the relative position of the main lever with respect to the support body and the handlebar is changed.

In this case, the internally threaded portion attached to the auxiliary lever is formed by an adjustment sleeve which has an externally threaded portion which is assigned to a threaded hole in the auxiliary lever, wherein the adjustment sleeve protrudes beyond the auxiliary lever in the direction of the support body and has a stop face which cooperates with a counterface on the support body. A basic or rest position of the auxiliary lever with respect to the support body can thus be set. Since the auxiliary lever is in turn effectively connected to the master cylinder, as a result a basic or rest position of the master cylinder piston and thus the "play" thereof can be adjusted via the auxiliary lever by rotating the adjustment sleeve in the threaded hole in the auxiliary lever, the term "play" meaning the travel of the master cylinder upon actuation of the hand lever fixture until the primary sealing element on the master cylinder piston travels over the pressure compensation hole towards the supply container and an actuating pressure is built up in the master cylinder.

The simple design of the adjustment device is furthermore promoted if a spring element is provided between the main lever and the auxiliary lever, which spring element prestresses the main lever in a direction of rotation about the second bearing point, said direction of rotation corresponding to the direction of rotation of the lever moment brought about by the actuating force on the main lever, that is to say ensures a prestress of the main lever in the "narrow grip" direction. The adjustment device must then fulfil only a stop function between the main lever and the auxiliary lever in the direction of rotation of the lever moment brought about by the actuating force on the main lever. The spring element in this case ensures a defined position of the main lever against a stop with respect to the auxiliary lever. Advantageously, the spring element may be a compression spring, preferably a cost-effective rubber spring, the line of action of which runs through the first bearing point.

In order to prevent unintentional adjustment of the grip width of the hand lever fixture, the adjustment device may furthermore have an anti-rotation means for the adjustment screw. However, in order that the grip width can be adjusted without great complexity, the arrangement may be such that the anti-rotation means for the adjustment screw can be released by pivoting the main lever about the second bearing point counter to the force of the spring element between the main lever and the auxiliary lever. In one simple embodiment, between the head and the threaded shaft, the adjustment screw may have an anti-rotation portion with a non-rotationally symmetrical cross-sectional shape, whereas the opening passed through by the threaded shaft is provided with a surface portion shaped in a manner complementary to the anti-rotation portion so as to receive the anti-rotation portion in a form-fitting manner.

Finally, a small size of the hand lever fixture is promoted if the central axis of the master cylinder runs essentially perpendicular to the longitudinal axis of the handlebar, wherein the central axis of the master cylinder, the bearing point between auxiliary lever and support body and the bearing point between over-center spring and support body are spaced apart from one another in the direction of the longitudinal axis of the handlebar.

BRIEF DESCRIPTION OF THE DRAWINGS

The invention will be explained in more detail below on the basis of a preferred example of embodiment and with reference to the appended drawings. In the drawings.

DETAILED DESCRIPTION OF THE EXAMPLE OF EMBODIMENT

Figure 12:
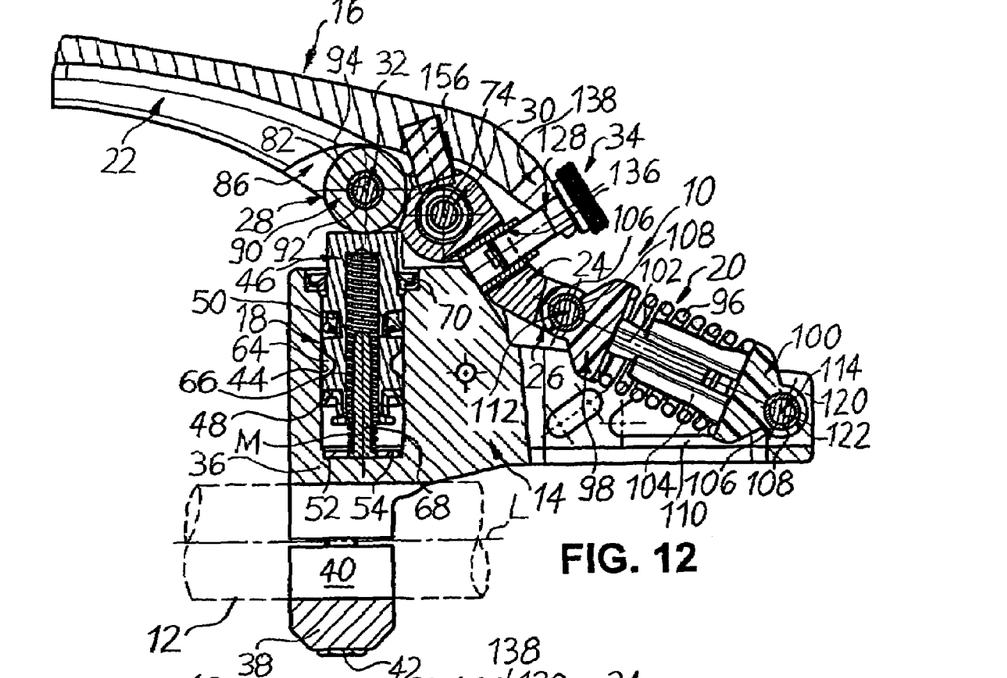
FIG. 12 shows a broken-away sectional view of the hand lever fixture of FIG. 1 along the section line XII-XII in FIG. 4, with the hand lever fixture being shown in the non-actuated state.

As shown in particular in FIGS. 1, 3 to 7 and 12 to 15, a hand lever fixture 10 for handlebar-controlled vehicles, particularly motorcycles, has a support body 14 which can be attached to a handlebar 12 (shown in dashed line in FIG. 12). Mounted pivotably on this support body are a hand lever 16, which is effectively connected to a master cylinder 18 in order to generate an actuating pressure, and an over-center spring which is generally denoted by reference 20. The over-center spring 20 is effectively connected to the hand lever 16 in such a way that, when the hand lever 16 is in a position between a dead center position and an end position, the over-center spring generates a lever moment on the hand lever 16, said lever moment acting in the direction of this-end position, as will be described in more detail below. It is essential firstly that the hand lever 16 is split into two, comprising a main lever 22 which can be acted upon manually with an actuating force F (cf. FIG. 3) and an auxiliary lever 24 which is pivotably mounted between its ends 26, 28 at a first bearing point 30 on the support body 14, wherein the over-center spring 20 is articulated at the first end 26 of the auxiliary lever 24 and an auxiliary force H resulting from the lever moment generated by the over-center spring 20 can be transmitted to the master cylinder 18 via the second end 28 of the auxiliary lever 24 (cf. FIG. 3 again, which shows the point of action and the line of action of the auxiliary force H even though the auxiliary force H is not exerted in said figure in the non-actuated state of the hand lever fixture 10 but rather only when the hand lever fixture 10 is actuated, that is to say when the hand lever 16 is pivoted); secondly, it is essential that the main lever 22 is pivotably mounted at a second bearing point 32 on the auxiliary lever 24 and an adjustment device 34 is arranged between the main lever 22 and the auxiliary lever 24, by means of which adjustment device the relative angular position of main lever 22 and auxiliary lever 24 with respect to the second bearing point 32 can be adjusted in order to adjust the grip width between the main lever 22 and the handlebar 12, as will likewise be described in more detail below.

Figures 1, 5:
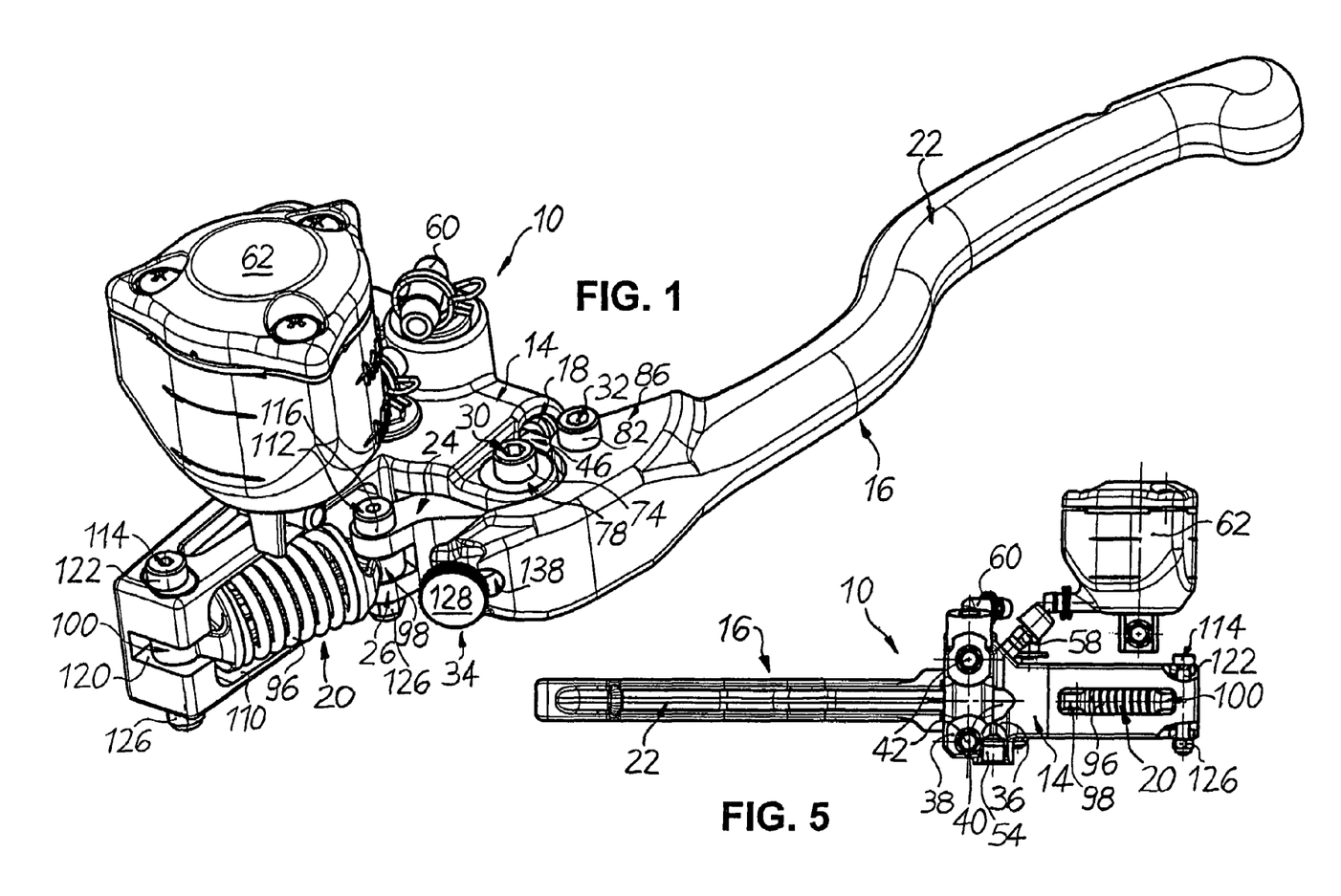
FIG. 1 shows a perspective view obliquely from the front of a hand lever fixture according to the invention in the non-actuated state.
FIG. 5 shows a broken-open rear view of the hand lever fixture of FIG. 1 from below in FIG. 3 and on the scale of FIG. 3.
Figure 2:
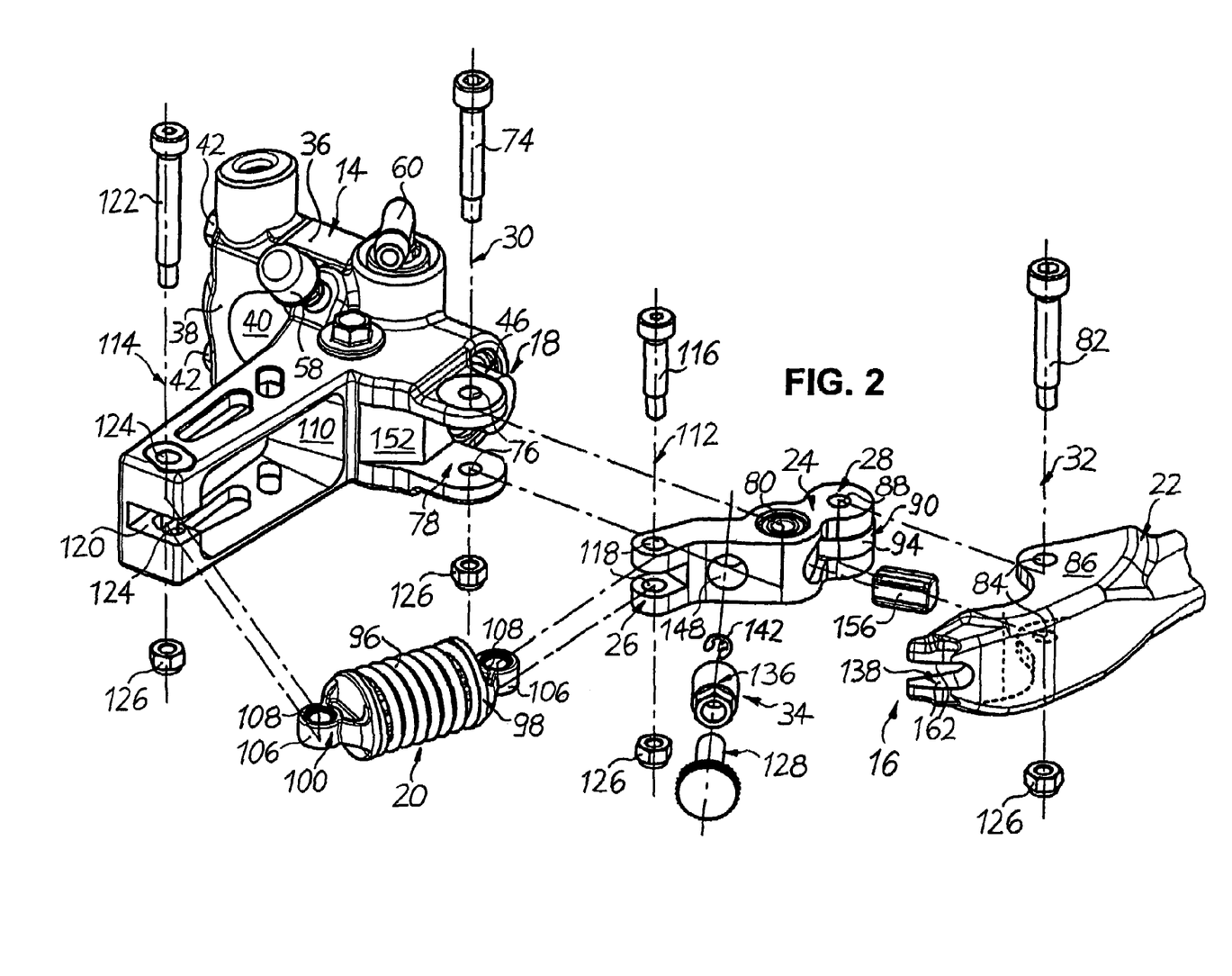
FIG. 2 shows a broken-open, exploded perspective view of the components which can be pivoted and adjusted relative to one another, namely a support body, a hand lever which is split into two parts (a main lever and an auxiliary lever), an over-center spring and an adjustment device for adjusting the relative angular position between the main lever and the auxiliary lever of the hand lever fixture of FIG. 1.
Figures 3, 6, 7:
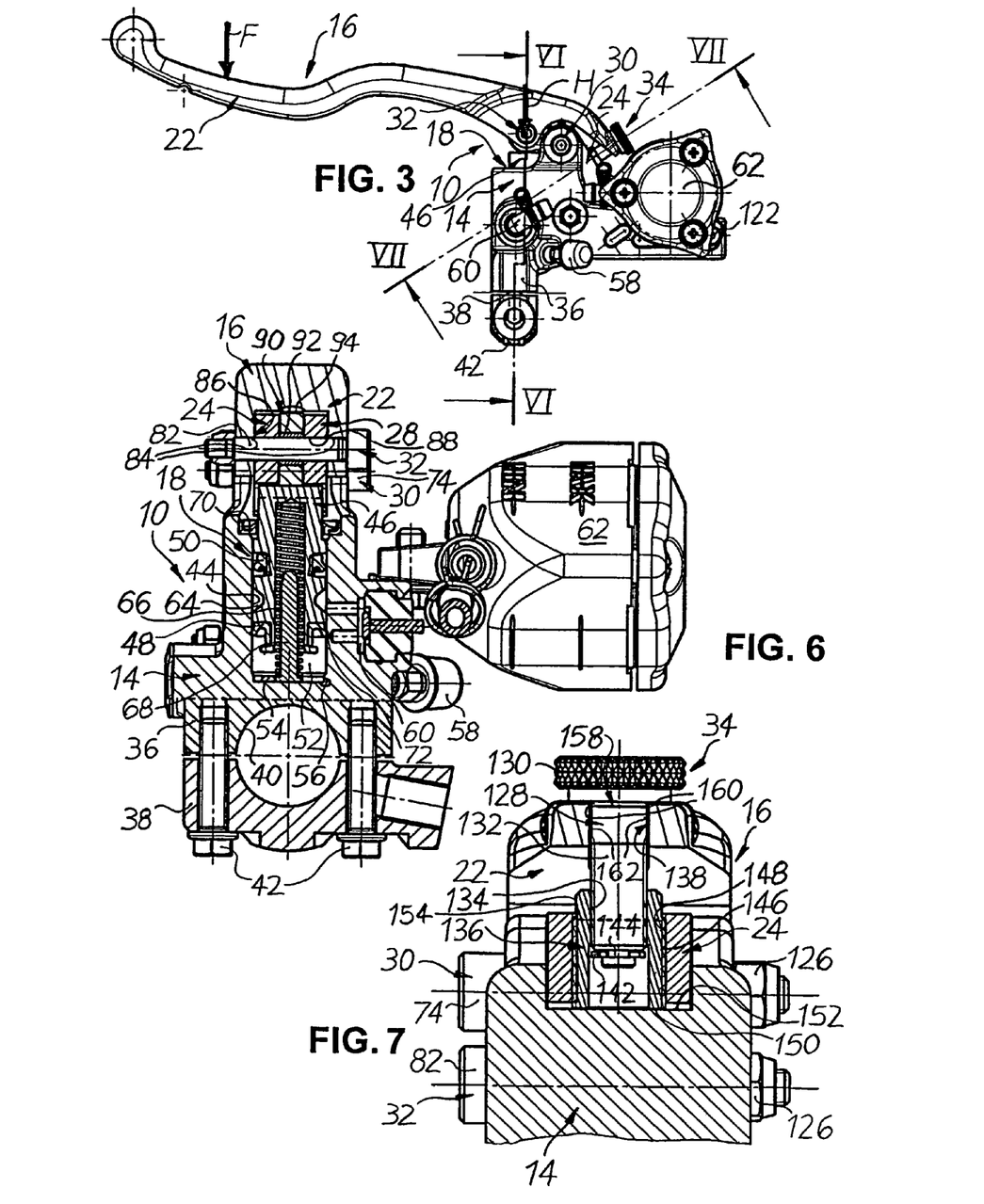
FIG. 3 shows a plan view of the hand lever fixture of FIG. 1 in the non-actuated state and on a smaller scale than FIG. 1.
FIG. 6 shows a sectional view of the hand lever fixture of FIG. 1 along the section line VI-VI in FIG. 3 and on the scale of FIG. 1.
FIG. 7 shows a broken-away sectional view of the hand lever fixture of FIG. 1 along the section line VII-VII in FIG. 3 and on an enlarged scale compared to FIG. 1.

As shown in particular in FIGS. 2 to 6 and 12 to 15, the support body 14, which is preferably made of an aluminium alloy, is formed in one piece with a clamp upper part 36 which cooperates with a clamp lower part 38 in order to fix the support body 14 on the handlebar 12. The clamp upper part 36 and the clamp lower part 38 delimit an essentially cylindrical through-opening 40, through which the handlebar 12 extends. As shown in FIG. 6, the clamp lower part 38 is provided on either side of the through-opening 40 with a through-hole, through which a fixing screw 42 extends. The fixing screws 42 engage with their heads behind the clamp lower part 38 and are screwed at one end into associated threaded holes in the clamp upper part 36 in order to clamp the clamp upper part 36 and the clamp lower part 38 to the handlebar 12 in a force-fitting manner.

Figure 13:
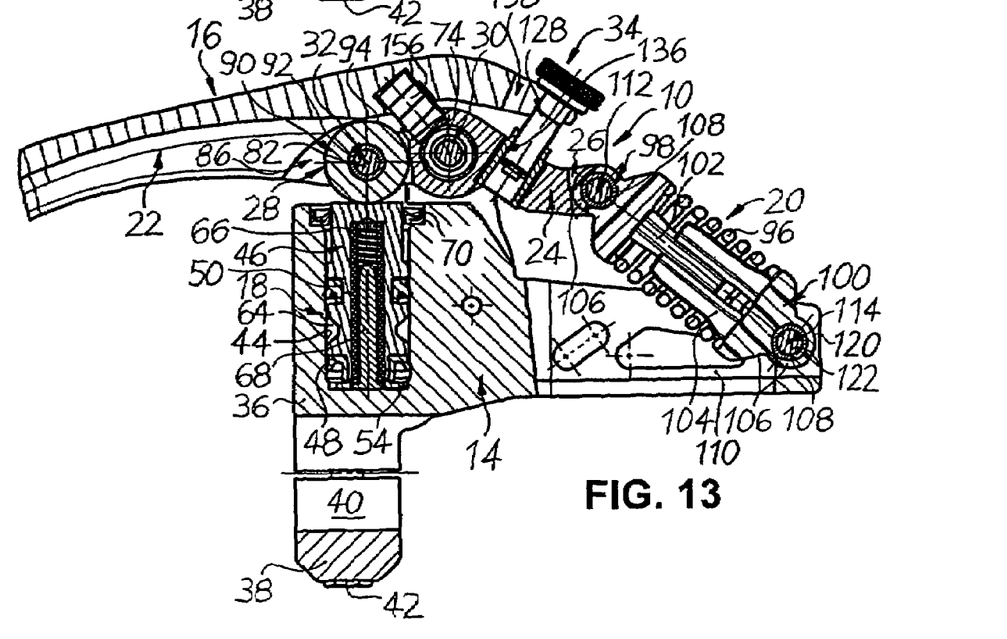
FIG. 13 shows a broken-away sectional view of the hand lever fixture of FIG. 1, along the section of FIG. 12, with the hand lever fixture being shown in the actuated state.
Figure 14:
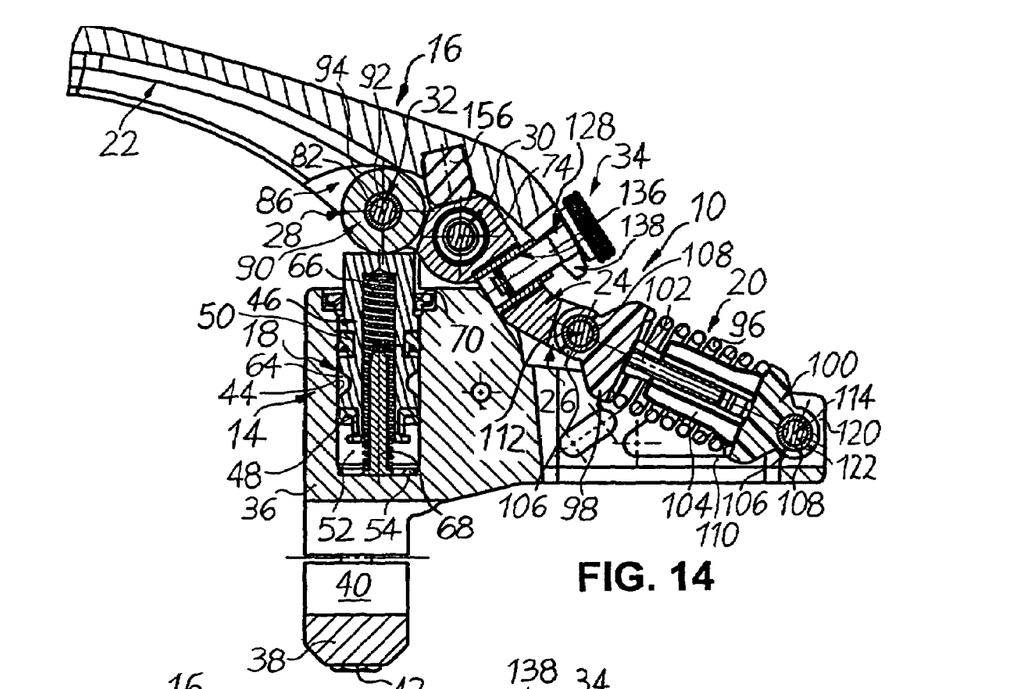
FIG. 14 shows a broken-away sectional view of the hand lever fixture of FIG. 1, along the section of FIG. 12, with the hand lever fixture being shown in the non-actuated state, wherein the grip width has been adjusted in the "wider grip" direction compared to the diagram of FIG. 12.

In the illustrated example of embodiment, the master cylinder 18 is furthermore integrated in the support body 14, as can be seen in particular in FIGS. 6 and 12 to 15. To this end, a cylindrical blind hole 44 is made in the support body 14, said blind hole serving to receive a piston 46. In a manner known per se, the piston 46 bears a primary sealing ring 48 and a secondary sealing ring 50, which are accommodated in respectively associated radial grooves in the piston 46. The piston 46 delimits at its end a pressure chamber 52 which in the assembled state of the hand lever fixture 10 communicates hydraulically with a slave cylinder (not shown) via a pressure connection 54 (cf. also FIG. 5) and a pressure line (likewise not shown). Also opening into the pressure chamber 52 is an air evacuation connection 56 (FIG. 6) which is closed towards the outside by an air evacuation screw 58 screwed into the support body 14. Furthermore, the master cylinder 18 has, in a manner known per se, an after-running connection 60, via which hydraulic fluid can flow from a supply container 62 into an after-running region 64 between the primary sealing ring 48 and the secondary sealing ring 50 and—in the basic or rest position of the piston 46 which is shown in FIGS. 6, 12 and 14—into the pressure chamber 52. To this end, the after-running connection 60 is hydraulically connected to the supply container 62 in a manner not shown in any greater detail in the figures, said supply container being fixed to the support body 14 in a suitable manner—likewise not shown in the figures.

With regard to the master cylinder 18, it should furthermore be noted that the piston 46 thereof is prestressed into its basic or rest position by a spring element, in the example of embodiment a helical compression spring 66, wherein the helical compression spring 66 is accommodated in a bore of the piston 46 and is prevented from buckling in the region of the pressure chamber 52 by a pin 68. As can be seen from FIGS. 6 and 12 to 15, the piston 46 with its end remote from the pressure chamber 52 extends through a securing and stripping ring 70 held in the support body 14 and protrudes there beyond the support body 14 even when pushed fully into the pressure chamber 52 (cf. FIGS. 13 and 15).

With regard to the function of the master cylinder 18, which has been known to the person skilled in the art for some time, all that must be mentioned at this point is that, in the rest position of the master cylinder 18 (FIGS. 6, 12 and 14), the piston is pushed against the hand lever 16 on account of the spring force of the helical compression spring 66. As shown in FIG. 6, the sealing edge of the primary sealing ring 48 which faces the pressure chamber 52 lies behind a compensating hole 72 of the after-running connection 60, so that volume compensation in the pressure chamber 52 may be effected via the after-running connection 60. When the hand lever fixture 10 is actuated, the piston 46 of the master cylinder 18 is pushed downwards by the hand lever 16 counter to the spring force of the helical compression spring 66 in FIGS. 6, 12 and 14. During this, the primary sealing ring 48 travels over the compensating hole 72 and thus breaks the hydraulic connection between the pressure chamber 52 of the master cylinder 18 and the supply container 62. As the piston 46 is moved further forward, the hydraulic fluid in the pressure chamber 52 of the master cylinder 18 is pushed via the pressure connection 54 into the line system (not shown here) of the hydraulic clutch actuation system or brake system; the rise in pressure begins.

When the hand lever fixture 10 is relieved of load, the helical compression spring 66 pushes the piston 46 back into its basic or rest position. The slave cylinder or (in the case of a hydraulic brake system) wheel brake cylinder is hydraulically relieved of load. At this point, a pressure difference may arise at the primary sealing ring 48, namely if the piston 46 returns to its basic or rest position under the action of the helical compression spring 66 more rapidly than the hydraulic fluid is pushed back out of the line system. As a result of this pressure difference, the sealing edge of the primary sealing ring 48 lifts off the cylinder wall, so that hydraulic fluid can flow out of the after-running region 64, over the sealing edge of the primary sealing ring 48 and into the pressure chamber 52. As soon as the pressure difference between the two sides of the primary sealing ring 48 is balanced, the excess amount of hydraulic fluid which has thus flowed in is pushed back into the supply container 62 through the compensating hole 72 which is still open.

FIG. 2 in particular shows further details as to how the support body 14, the over-center spring 20, the main lever 22 and the auxiliary lever 24 are connected to one another in an articulated manner. The first bearing point 30 between the support body 14 and the auxiliary lever 24 has a bearing pin 74 which passes through associated bearing holes 76 in a bearing section 78 of the support body 14, said bearing section being slotted in a forked manner and accommodating the auxiliary lever 24, and a bearing hole 80 in a central region of the auxiliary lever 24, said bearing hole optionally being lined with a sliding bushing or the like.

The second bearing point 32, which is located at the second end 28 of the auxiliary lever 24 via which the auxiliary force H can be transmitted to the master cylinder 18, also has a bearing pin 82. The bearing pin 82 passes through associated bearing holes 84 in a bearing section 86 of the main lever 22, said bearing section being essentially U-shaped when seen in cross section (cf. FIG. 6), and a bearing hole 88 at the second end 28 of the auxiliary lever 24 which is accommodated in the bearing section 86 of the main lever 22. As can furthermore be seen from FIGS. 2 and 6, the second end 28 of the auxiliary lever 24 is designed to be slotted so as to receive an annular cylindrical rolling body 90. The rolling body 90, which is mounted to rotate on the bearing pin 82 by means of a sliding bushing 92 or the like, bears in a manner effective for actuation with its outer circumferential surface 94 against the end of the piston 46 of the master cylinder 18 which protrudes beyond the support body 14, as shown in particular in FIGS. 6 and 12, as a result of which the hand lever 16 can act on the master cylinder 18, or more specifically the piston 46 thereof, with little friction.

As can be seen in particular from FIGS. 12 to 15, the over-center spring, which is generally denoted by reference 20, consists of a helical compression spring 96 and two articulation pieces 98, 100 made of a suitable plastic which are arranged at the two longitudinal ends of the helical compression spring 96. The articulation pieces 98, 100, which serve inter alia as spring plates, extend into the interior of the helical compression spring 96 and engage in one another there by means of complementarily shaped guide portions 102, 104, so that they can move in a sliding manner. The guide portions 102, 104 thus provide a spring movement of the helical compression spring 96 in the longitudinal direction of the latter, but by means of a form-fitting connection prevent any buckling of the helical compression spring 96. Each articulation piece 98, 100 furthermore has a bearing eye 106 which is lined with a bearing bushing 108.

As can be seen in particular from FIG. 2, the over-center spring 20, which is received in a space-saving manner in a cut-out 110 of the support body 14, is articulated by its articulation piece 98 on the hand lever side at a third bearing point 112 at the first end 26 of the auxiliary lever 24. With its articulation piece 100 on the support body side, on the other hand, the over-center spring 20 is articulated at a fourth bearing point 114 on the support body 14. As shown in particular in FIG. 2, the third bearing point 112 between the over-center spring 20 and the auxiliary lever 24 has a bearing pin 116 which passes through associated bearing holes 118 in the first end 26 of the auxiliary lever 24, said first end being slotted in the manner of a fork and receiving the bearing eye 106 of the articulation piece 98 on the hand lever side, and the bearing bushing 108 in the articulation piece 98. The support body 14 is also provided with a slot 120 at the end of the cut-out 110 remote from the master cylinder 18, which slot serves to receive the bearing eye 106 of the articulation piece 100 on the support body side of the over-center spring 20. The fourth bearing point 114 between the over-center spring 20 and the support body 14 likewise has a bearing pin 122 which passes through associated bearing holes 124 in the support body 14 and also the bearing bushing 108 of the bearing eye 106 of the articulation piece 100 on the support body side, said bearing eye being received in the slot 120 of the support body 14. Finally, the bearing pins 74, 82, 116 and 122 are all fixed at the respective installation site, to which end, in the illustrated example of embodiment, each of the bearing pins 74, 82, 116 and 122 has a head at one end and a threaded portion at the other end, onto which threaded portion a self-securing nut 126 is screwed in each case, so that the respective bearing pin 74, 82, 116 and 122 is held at the respective installation site between its head and the respective nut 126.

It can be seen from the above description that the over-center spring 20 can pivot relative to the support body 14 about the fourth bearing point 114 and relative to the auxiliary lever 24 about the third bearing point 112. At the same time, the auxiliary lever 24 can pivot relative to the support body 14 about the first bearing point 30. As a result of the described fixing of the bearing pins 74, 116 and 122, unleashing of the link chain prestressed by the over-center spring 20 is prevented, so that the link chain consisting of support body 14, over-center spring 20 and auxiliary lever 24 is already closed per se independently of the fixing of the hand lever fixture 10 on the handlebar 12.

Figure 15:
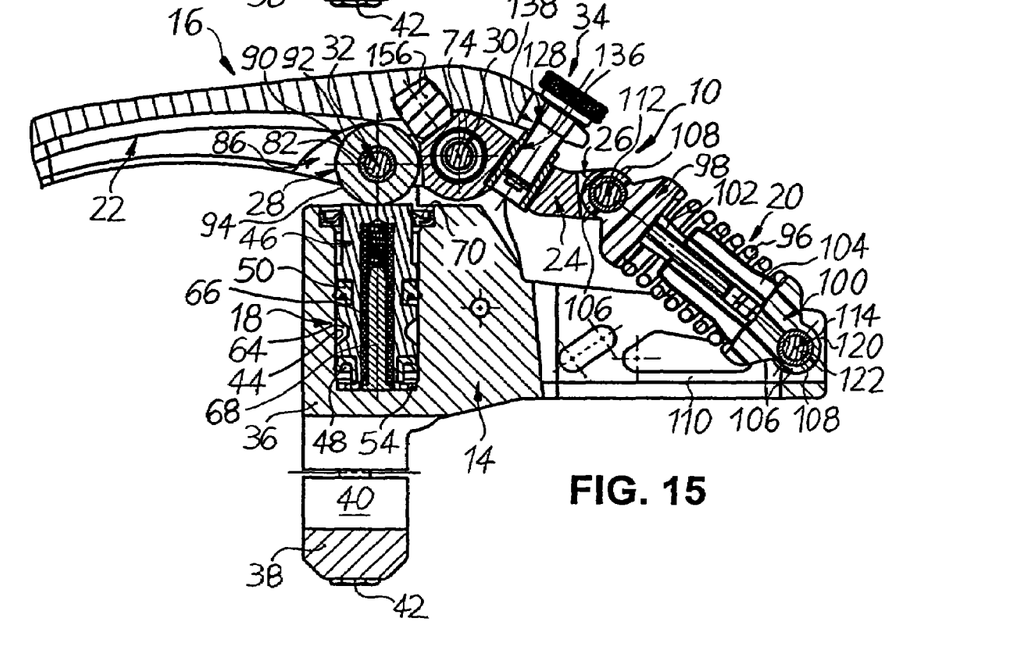
FIG. 15 shows a broken-away sectional view of the hand lever fixture of FIG. 1, along the section of FIG. 12, with the hand lever fixture being shown in the actuated state and with the grip width adjustment of FIG. 14 being shown.

The described link chain can be located in two end positions, namely on the one hand in the end position shown in FIGS. 1, 3 to 7, 12 and 14 (non-actuated state of the master cylinder 18), in which the over-center spring 20 generates on the auxiliary lever 24 a torque about the first bearing point 30 on the support body 14 which is directed in the clockwise direction in FIGS. 12 and 14, and on the other hand in an end position (actuated state of the master cylinder 18) in which the over-center spring 20 generates on the auxiliary lever 24 a torque about the first bearing point 30 on the support body 14 which is directed in the counter-clockwise direction in FIGS. 13 and 15.

In other words, when the hand lever 16 and thus—via the adjustment device 34—the auxiliary lever 24 is pivoted from the end position shown in FIGS. 12 and 14 about the first bearing point 30 on the support body 14 in the counter-clockwise direction, the over-center spring 20 is firstly compressed until the line of action of the over-center spring 20 which runs through the third bearing point 112 and the fourth bearing point 114 migrates through the first bearing point 30 and the three bearing points 30, 112 and 114 lie in a row one behind the other (unstable dead center position). When the hand lever 16 is pivoted further in the counter-clockwise direction, the over-center spring 20 is relieved again and in the process pushes the auxiliary lever 24 in the direction of its other end position. The abovementioned auxiliary force H is exerted on the piston 46 of the master cylinder 18 via the rolling body 90 at the second end 28 of the auxiliary lever 24, as a result of which the hand lever 16 is "relieved of load", that is to say a lesser actuating force F needs to be applied by hand compared to a hand lever fixture without an over-center spring on the hand lever 16 for a given position of the piston 46 in the master cylinder 18.

The return of the hand lever 16 to its end position shown inter alia in FIGS. 12 and 14 is effected in a corresponding manner, that is to say firstly, when the hand lever 16 is pivoted back about the first bearing point 30 in the clockwise direction, the over-center spring 20 is compressed until the dead center position is reached; thereafter, the over-center spring pushes the hand lever 16 into its end position shown inter alia in FIGS. 12 and 14. No further explanation is required in respect of the fact that, in the assembled state of the hand lever fixture 10, besides the aforementioned manual actuating force F (input), other external forces act on the hand lever fixture 10, namely on the output side—for example, when used on a hydraulic clutch actuation system—the spring force of the clutch which is transmitted to the master cylinder 18 via the fluid column between the slave cylinder (not shown) and said master cylinder 18, the spring force of the helical compression spring 66 is added thereto and acts back on the hand lever 16 via the piston 46. The forces and levers are adapted in such a way that the torque generated by the spring forces of the clutch and of the helical compression spring 66 on the auxiliary lever 24 in FIGS. 12 to 15 in the clockwise direction about the first bearing point 30 is always greater than the torque which the over-center spring 20 applies to the auxiliary lever 24 in FIGS. 12 to 15 in the counter-clockwise direction about the first bearing point 30. As a result, the hand lever 16 automatically moves back from an actuating position, as shown for example in FIGS. 13 and 15, to its basic or rest position as shown in FIGS. 12 and 14 when the hand lever 16 is relieved of load, that is to say the actuating force F is taken away.

With regard to the spatial relative position of handlebar 12, master cylinder 18, over-center spring 20 and auxiliary lever 24, it should be mentioned at this point that, as shown in FIG. 12, the central axis M of the master cylinder 18 runs essentially perpendicular to the longitudinal axis L of the handlebar 12, wherein the central axis M of the master cylinder 18, the first bearing point 30 between auxiliary lever 24 and support body 14 and the fourth bearing point 114 between over-center spring 20 and support body 14 are spaced apart from one another in the direction of the longitudinal axis L of the handlebar 12, as a result of which the hand lever fixture 10 is of a particularly compact design.

FIGS. 2 and 7 to 15 in particular show further details regarding the adjustment device 34 for adjusting the relative angular position between main lever 22 and auxiliary lever 24 with respect to the second bearing point 32. The pivotable mounting of the main lever 22 on the auxiliary lever 24 at the second bearing point 32 has already been described above. As shown in FIGS. 2 and 12 to 15, the adjustment device 34 acts on the auxiliary lever 24 at a distance from the second bearing point 32, more specifically between the first end 26 of the auxiliary lever 24 at which the over-center spring 20 is articulated and the first bearing point 30 at which the auxiliary lever 24 is pivotably mounted on the support body 14.

The adjustment device 34 comprises an adjustment screw 128 having a head 130 and a threaded shaft 132 and also an internally threaded portion 134 associated with the threaded shaft 132, which internally threaded portion may be attached to the auxiliary lever 24 or to the main lever 22, whereas the respective other lever has an opening which is passed through by the threaded shaft 132 of the adjustment screw 128, with the head 130 of the adjustment screw 128 engaging behind this lever at the end of the opening remote from the internally threaded portion 134. In the illustrated example of embodiment, the internally threaded portion 134 is formed on an adjustment sleeve 136 attached to the auxiliary lever 24, whereas said opening in the main lever 22 is formed by a slot 138 at the right-hand end of the main lever 22 in FIGS. 12 to 15.

Figures 4, 8, 9, 10, 11:
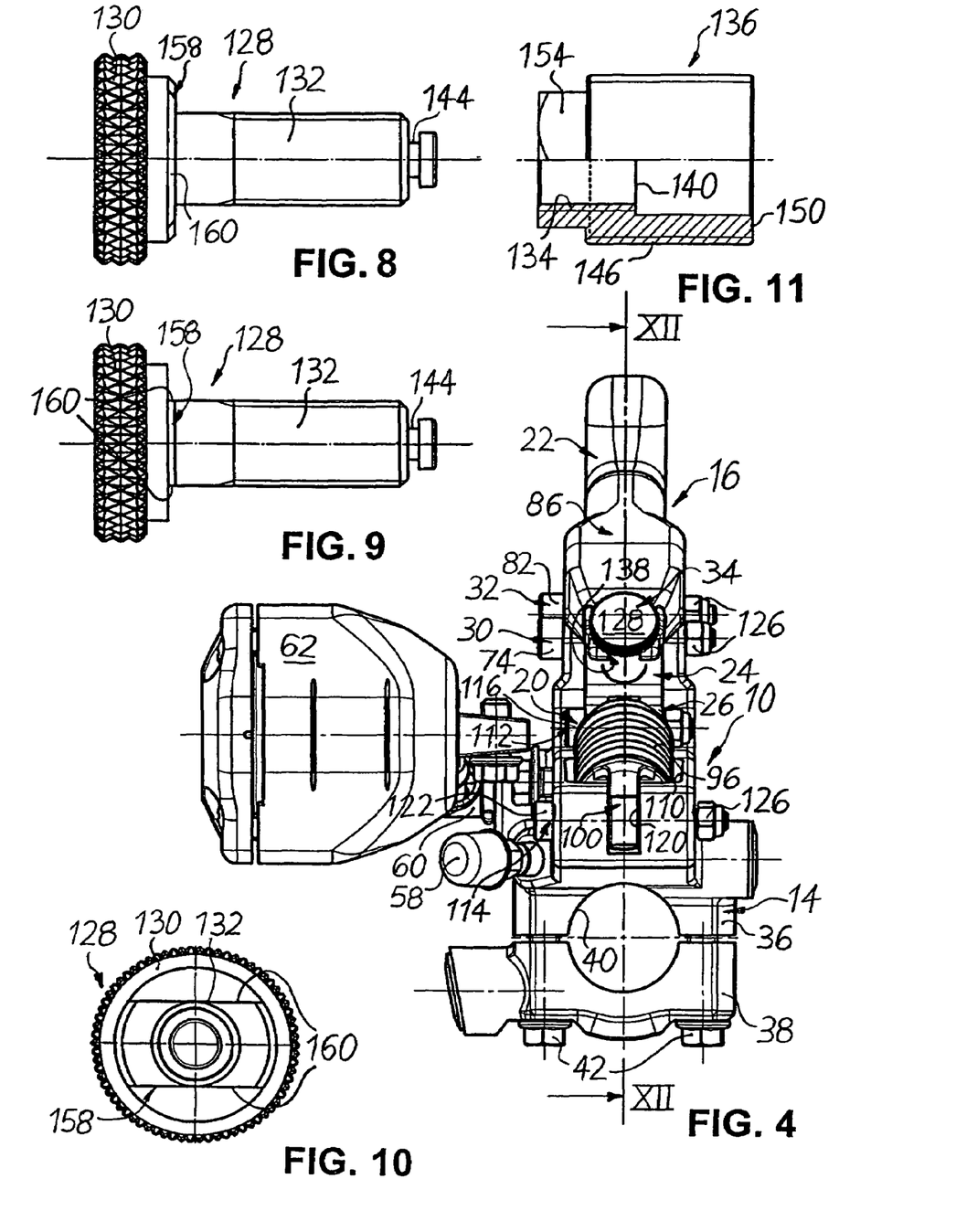
FIG. 4 shows a side view of the hand lever fixture of FIG. 1 from the right in FIG. 3 and on the scale of FIG. 1.
FIG. 8 shows a plan view of an adjustment screw of the adjustment device for adjusting the grip width on the hand lever fixture of FIG. 1, on a considerably enlarged scale compared to the previous figures.
FIG. 9 shows a front view of the adjustment screw of FIG. 8 from above in FIG. 8.
FIG. 10 shows a side view of the adjustment screw of FIG. 8 from the right in FIG. 9.
FIG. 11 shows a partially broken-away plan view of an adjustment sleeve of the adjustment device for adjusting the grip width on the hand lever fixture of FIG. 1, on the scale of FIG. 8.

As can be seen from FIG. 11, the internally threaded portion 134 extends approximately only over half the axial length of the adjustment sleeve 136 and ends in the adjustment sleeve 136 with an annular shoulder 140. The annular shoulder 140 forms a stop for a securing element 142 (cf. FIGS. 2 and 7) which is fixed on the adjustment screw 128, more specifically is inserted into a radial groove 144 at the end of the adjustment screw 128 remote from the head 130, in order to secure the adjustment screw 128 against loss.

On the outer circumference side, the adjustment sleeve 136 as shown in FIG. 11 has an externally threaded portion 146 which as shown in FIG. 7 is associated with a threaded hole 148 in the auxiliary lever 24. As can furthermore be seen from FIG. 7, the adjustment sleeve 136 protrudes beyond the auxiliary lever 24 in the direction of the support body 14, wherein the annular end face of the adjustment sleeve 136 forms a stop face 150 which cooperates with a flat counterface 152 on the support body 14 in order to define an end position (cf. FIGS. 12 and 14) of the auxiliary lever 24. It can be seen from FIGS. 12 and 14 that the basic or rest position of the piston 46 of the master cylinder 18 can be set by means of the adjustment sleeve 136. If the adjustment sleeve 136 is screwed further into the threaded hole 148 in the auxiliary lever 24, this leads, when the stop face 150 of the adjustment sleeve 136 bears against the counterface 152 on the support body 14, to the auxiliary lever 24 being pivoted in the counter-clockwise direction about the first bearing point 30, and this in turn leads to the piston 46 being pushed downwards via the rolling body 90 in FIGS. 12 and 14. On the other hand, if the adjustment sleeve 136 is screwed further out of the threaded hole 148, the auxiliary lever 24 pivots in the clockwise direction about the first bearing point 30, whereupon the piston 46 moves upwards under the force of the helical compression spring 66 in FIGS. 12 and 14. The axial distance between the sealing lip of the primary sealing ring 48 and the compensating hole 72

(cf. FIG. 6) can thus be set to meet the respective requirements. Once this "play" of the piston 46 has been suitably set, the adjustment sleeve 136 can be secured against rotation with respect to the auxiliary lever 24, for example by means of an adhesive or by notching or crimping the adjustment sleeve 136 to the auxiliary lever 24. In order to be able to carry out said adjustment, the adjustment sleeve 136 moreover has a key face 154 which adjoins the externally threaded portion 146 in the longitudinal direction of the adjustment sleeve 136.

As shown in FIGS. 2 and 12 to 15, a spring element 156 is furthermore provided between the main lever 22 and the auxiliary lever 24, which spring element prestresses the main lever 22 about the second bearing point 32 in FIGS. 12 to 15 in a counter-clockwise direction, that is to say in a direction of rotation which corresponds to the direction of rotation of the torque brought about by the actuating force F on the main lever 22. In the illustrated example of embodiment, the spring element 156 is a compression spring in the form of a rubber spring, the line of action of which runs through the first bearing point 30. In order to show the relative dimensions of the spring element 156, this is shown in the non-deformed state in FIGS. 12 and 13 but in the deformed or compressed state in FIGS. 14 and 15. As a result of the force of the spring element 156, the main lever 22 is normally held with its end provided with the slot 138 bearing against the head 130 of the adjustment screw 128, as shown in FIGS. 12 to 15.

It can be seen from the above description that the adjustment device 34 can be used to adjust the grip width of the hand lever fixture 10, that is to say the clear distance between the hand lever 16 and the handlebar 12. When the adjustment screw 128, which may be provided with a knurled profile or the like on the outer circumference of the head 130 for the sake of better handling, as shown in the figures, is screwed further into the adjustment sleeve 136 starting from the position shown in FIG. 12 for example, so that it assumes for example the position shown in FIG. 14, the main lever 22 pivots with respect to the auxiliary lever 24 counter to the force of the spring element 156 in FIG. 12 in the clockwise direction about the second bearing point 32. As a result, the clear distance between the main lever 22 and the handlebar 12 increases. When, on the other hand, the adjustment screw 128 is screwed further out of the adjustment sleeve 136, the main lever 22 pivots with the force of the spring element 156 in FIG. 12 in the counter-clockwise direction about the second bearing point 32 with respect to the auxiliary lever 24; the clear distance between the main lever 22 and the handlebar 12 decreases. The grip width is accordingly adjusted independently of the geometry of the prestressed assembly consisting of support body 14, over-center spring 20 and auxiliary lever 24, and thus has no effect on the auxiliary force assistance brought about by the over-center spring 20.

With regard to the adjustment device 34, it should finally also be mentioned that, in the illustrated example of embodiment, this is also provided with an anti-rotation means for the adjustment screw 128 in order to prevent any unintentional adjustment of the grip width. In order to form the anti-rotation means, the adjustment screw 128 shown in FIGS. 7 to 10 has, between its head 130 and the threaded shaft 132, an anti-rotation portion 158 with a non-rotationally symmetrical cross-sectional shape, which in the illustrated example of embodiment is formed by two plane-parallel surfaces 160, whereas the slot 138 in the main lever 22 which is passed through by the threaded shaft 132 of the adjustment screw 128 is provided with a surface portion shaped in a manner complementary to the anti-rotation portion 158 on the adjustment screw 128 so as to receive the anti-rotation portion 158 in a form-fitting manner—said surface portion of the slot 138 likewise being formed in the illustrated example of embodiment by two plane-parallel surfaces 162, as shown in FIGS. 2 and 7, the clear distance between said plane-parallel surfaces 162 essentially corresponding to the distance between the surfaces 160 of the anti-rotation portion 158.

It can be seen from the above description in conjunction with the figures that the anti-rotation means for the adjustment screw 128 can be released by pivoting the main lever 22 about the second bearing point 32 counter to the force of the spring element 156, that is to say in the clockwise direction in FIGS. 12 and 14, wherein the anti-rotation portion 158 on the adjustment screw 128 comes free from the plane-parallel surfaces 162 of the slot 138 in the main lever 22 so that the adjustment screw 128 can be rotated. In order to secure it once again against rotation, the adjustment screw 128 must be rotated until its anti-rotation portion 158, or more specifically the plane-parallel surfaces 160, are aligned with the plane-parallel surfaces 162 of the slot 138, whereupon the main lever 22 can be released so that, under the force of the spring element 156, it returns to its initial position in which it bears with its slotted end against the head 130 of the adjustment screw 128.

There is disclosed a hand lever fixture which has a support body which can be attached to a handlebar, on which support body a hand lever and an over-center spring are pivotably mounted, said hand lever being effectively connected to a master cylinder and said over-center spring being effectively connected to the hand lever, which over-center spring, when the hand lever is in a position between a dead center position and an end position, generates a lever moment on the hand lever, said lever moment acting in the direction of the end position. According to the invention, the hand lever is split into two, into a main lever which can be acted upon with a manual force and an auxiliary lever which is pivotably mounted on the support body, at the end of which auxiliary lever the over-center spring is articulated while an auxiliary force resulting from the over-center spring lever moment can be transmitted to the master cylinder via its other end, wherein the main lever is pivotably mounted on the auxiliary lever and an adjustment device is arranged between the main lever and the auxiliary lever, by means of which adjustment device the relative angular position of main lever and auxiliary lever can be adjusted. As a result, a compact hand lever fixture is provided in which the grip width between hand lever and handlebar can be adjusted without this having an effect on the force assistance brought about by the over-center spring.

We claim:

1. Hand lever fixture for handlebar-controlled vehicles, the fixture comprising a support body which can be attached to a handlebar, a hand lever and an over-center spring being pivotably mounted on the support body, said hand lever being effectively connected to a master cylinder in order to generate an actuating pressure, wherein the over-center spring is effectively connected to the hand lever in such a way that, when the hand lever is in a position between a dead center position and an end position, the over-center spring generates a lever moment on the hand lever, said lever moment acting in the direction of said end position, wherein the hand lever is split into two, comprising a main lever which can be acted upon manually with an actuating force and an auxiliary lever having a first end and a second end, the auxiliary lever being pivotably mounted between first and second ends at a first bearing point on the support body, the over-center spring being articulated at the first end of the auxiliary lever while an auxiliary force resulting from the lever moment generated by the over-center spring can be transmitted to the master cylinder via the second end of the auxiliary lever, and wherein the main lever is pivotably mounted on the auxiliary lever at a second bearing point and an adjustment device is arranged between the main lever and the auxiliary lever, the adjustment device serving to adjust a relative angular position of main lever and auxiliary lever with respect to the second bearing point.

2. Hand lever fixture according to claim 1, wherein the second bearing point is located at the second end of the auxiliary lever.

3. Hand lever fixture according to claim 2, wherein the master cylinder has a piston and the second bearing point has a bearing pin which passes through associated bearing holes in the main lever and in the auxiliary lever, and wherein a rolling body having an outer circumferential surface is rotatably mounted on the bearing pin, said rolling body bearing with the outer circumferential surface against the piston of the master cylinder in a manner effective for actuation.

4. Hand lever fixture according to claim 1, wherein the adjustment device acts on the auxiliary lever at a distance from the second bearing point.

5. Hand lever fixture according to claim 4, wherein the adjustment device acts on the auxiliary lever between the first end of the auxiliary lever and the first bearing point.

6. Hand lever fixture according to claim 1, wherein a spring element is provided between the main lever and the auxiliary lever, said spring element prestressing the main lever in a direction of rotation about the second bearing point, said direction of rotation corresponding to the direction of rotation of the lever moment brought about by the actuating force on the main lever.

7. Hand lever fixture according to claim 6, wherein the spring element is a compression spring, having a line of action which runs through the first bearing point.

8. Hand lever fixture according to claim 7, wherein the compression spring is a rubber spring.

9. Hand lever fixture according to claim 1, wherein the adjustment device comprises an adjustment screw having a head and a threaded shaft and also an internally threaded portion associated with the threaded shaft, wherein the internally threaded portion is attached to the auxiliary lever, whereas the main lever has an opening which is passed through by the threaded shaft of the adjustment screw, with the head of the adjustment screw engaging behind the main lever at the end of the opening remote from the internally threaded portion.

10. Hand lever fixture according to claim 9, wherein the internally threaded portion attached to the auxiliary lever is formed by an adjustment sleeve which has an externally threaded portion which is assigned to a threaded hole in the auxiliary lever, wherein the adjustment sleeve protrudes beyond the auxiliary lever in the direction of the support body and has a stop face which co-operates with a counterface on the support body.

11. Hand lever fixture according to claim 9, wherein the adjustment device has an anti-rotation means for the adjustment screw.

12. Hand lever fixture according to claim 11, wherein a spring element is provided between the main lever and the auxiliary lever, said spring element prestressing the main lever in a direction of rotation about the second bearing point, said direction of rotation corresponding to the direction of rotation of the lever moment brought about by the actuating force on the main lever, and wherein the anti-rotation means for the adjustment screw can be released by pivoting the main lever about the second bearing point counter to the force of the spring element.

13. Hand lever fixture according to claim 12, wherein, between the head and the threaded shaft, the adjustment screw has an anti-rotation portion with a non-rotationally symmetrical cross-sectional shape, whereas the opening passed through by the threaded shaft is provided with a surface portion shaped in a manner complementary to the anti-rotation portion so as to receive the anti-rotation portion in a form-fitting manner.

14. Hand lever fixture according to claim 1, wherein the adjustment device comprises an adjustment screw having a head and a threaded shaft and also an internally threaded portion associated with the threaded shaft, wherein the internally threaded portion is attached to the main lever, whereas the auxiliary lever has an opening which is passed through by the threaded shaft of the adjustment screw, with the head of the adjustment screw engaging behind this auxiliary lever at the end of the opening remote from the internally threaded portion.

15. Hand lever fixture according to claim 14, wherein the adjustment device has an anti-rotation means for the adjustment screw.

* * * * *